United States Patent
Deza et al.

(10) Patent No.: US 12,147,328 B2
(45) Date of Patent: Nov. 19, 2024

(54) AUTOMATED TESTING PLATFORM FOR TESTING MULTIPLE DEVICES

(71) Applicants: Leo Deza, Torrance, CA (US); Terry Tata, Seattle, WA (US)

(72) Inventors: Leo Deza, Torrance, CA (US); Terry Tata, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/224,364

(22) Filed: Jul. 20, 2023

(65) Prior Publication Data
US 2023/0359545 A1    Nov. 9, 2023

Related U.S. Application Data

(63) Continuation of application No. 17/322,426, filed on May 17, 2021, now Pat. No. 11,748,234.

(51) Int. Cl.
*G06F 11/36* (2006.01)
*G06F 9/54* (2006.01)
(Continued)

(52) U.S. Cl.
CPC .......... *G06F 11/3664* (2013.01); *G06F 9/547* (2013.01); *G06F 11/3688* (2013.01);
(Continued)

(58) Field of Classification Search
CPC ......... G06F 11/3664–3696; G06F 9/54; G06F 9/547; G06F 9/548; H04W 24/06;
(Continued)

(56) References Cited

U.S. PATENT DOCUMENTS

| | | |
|---|---|---|
| 2014/0129878 A1 | 5/2014 | Saltzman et al. |
| 2014/0258778 A1 | 9/2014 | Kimm et al. |

(Continued)

FOREIGN PATENT DOCUMENTS

| | | |
|---|---|---|
| CN | 112463618 A | 3/2021 |
| EP | 2879358 B1 | 6/2020 |
| WO | 2005074613 A2 | 8/2005 |

OTHER PUBLICATIONS

International Search Report and Written Opinion received in Patent Cooperation Treaty Application No. PCT/US2022/028793, dated Aug. 10, 2022, 12 pages.

(Continued)

*Primary Examiner* — Geoffrey R St Leger
(74) *Attorney, Agent, or Firm* — CM Law; Stephen J. Weed

(57) ABSTRACT

A testing system includes a client library that functions as a proxy for remote procedure calls to allow commands to be issued directly from a test framework including an interface that enables remote procedure call commands to be sent to a device under test from a mobile device and responses from the device under test to be received and forwarded to the mobile device, even where the mobile device and device under test have different operating systems. A client program adapted to run on the device under test sends and receives remote procedure call commands from the device under test to and from a test server that implements the test framework and manages a device state of the device under test. In a pairing test, the remote procedure call commands include commands adapted to emulate a button press for initiating pairing between the mobile device and the device under test.

20 Claims, 15 Drawing Sheets

(51) Int. Cl.
*H04L 67/01* (2022.01)
*H04L 67/133* (2022.01)
*H04L 67/50* (2022.01)
*H04L 67/564* (2022.01)
*H04W 4/80* (2018.01)
*H04W 24/06* (2009.01)

(52) U.S. Cl.
CPC ........ *G06F 11/3696* (2013.01); *H04L 67/133* (2022.05); *H04L 67/535* (2022.05); *H04L 67/564* (2022.05); *H04W 4/80* (2018.02); *H04W 24/06* (2013.01); *H04L 67/01* (2022.05)

(58) Field of Classification Search
CPC ........ H04W 4/80; H04L 67/01; H04L 67/133; H04L 9/40; H04L 67/535; H04L 67/564
USPC .................................................. 717/124, 134
See application file for complete search history.

(56) References Cited

U.S. PATENT DOCUMENTS

2020/0073385 A1 3/2020 Jobanputra et al.
2020/0379034 A1 12/2020 Khandhar et al.

OTHER PUBLICATIONS

Vince, Tibor, et al., "Design and Implementation of Smart Glasses Solution in Electromechanical Systems", IEEE International Conference on Modern Electrical and Energy Systems, Sep. 2021, 4 pages.

Xu, Qiaozhi, et al., "Building a Lightweight Testbed Using Devices in Personal Area Networks", 26th International Conference on Computer Communication and Networks, Jul. 2017, 2 pages.

AUTOMATED TESTING PLATFORM FOR TESTING MULTIPLE DEVICES

CROSS-REFERENCE TO RELATED APPLICATIONS

This application is a Continuation of U.S. application Ser. No. 17/322,426 filed on May 17, 2021, the contents of which are incorporated fully herein by reference.

TECHNICAL FIELD

Examples set forth in the present disclosure relate to an automated testing platform for testing multiple devices including wearable electronic devices. More particularly, but not by way of limitation, the present disclosure describes an automated test infrastructure for running tests of multiple physical devices (including wearable electronic devices such as smart glasses) and software platforms.

BACKGROUND

Wearable electronic devices such as electronic eyewear devices may communicate with application programs running on mobile devices such as a user's smartphone and, in some cases, may communicate directly with a server. In either case, the electronic eyewear device may support direct device integration with communication application services such as Lens delivery, Scan, Send-to-friends, Save to memories, Telemetry, Stories, Discover, and Games available from Snap, Inc. of Santa Monica, CA, as well as third-party application programming interfaces (APIs) such as text-to-speech, the SHAZAM PLAYER® app, and the like. Such communications may occur via low power connections such as BLUETOOTH®.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
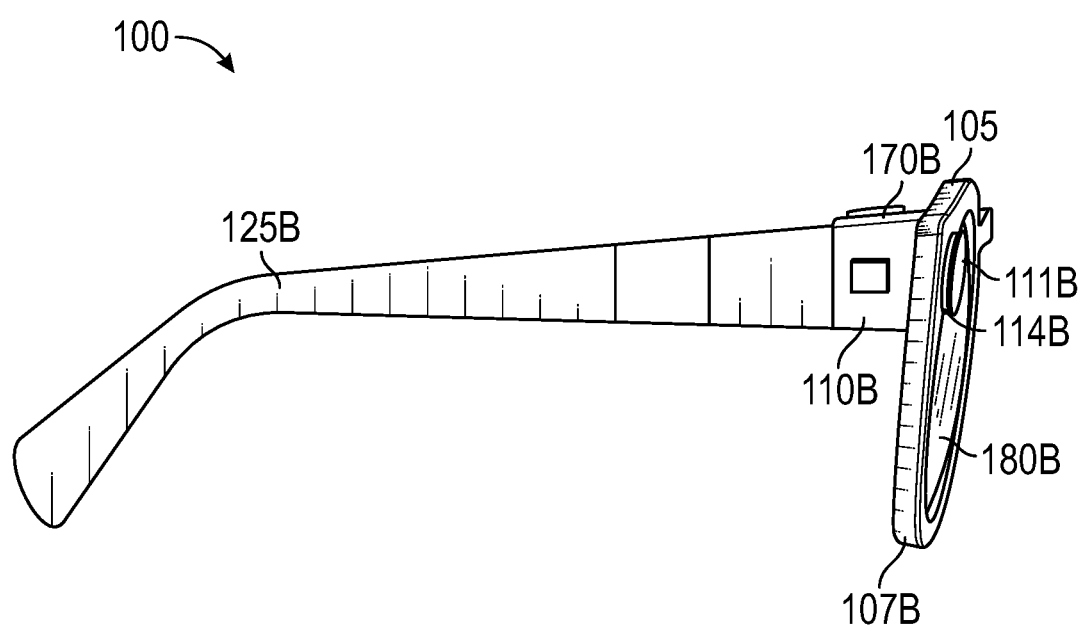
FIG. 1A illustrates a side view of an example hardware configuration of an electronic eyewear device showing a right optical assembly with an image display.

Examples of automated test infrastructures for running tests of multiple physical devices (including wearable electronic devices such as smart glasses) and software platforms are described. Wearable electronic devices may communicate with at least one of a mobile device or a server (which may include a proxy server) to implement functionality of the wearable electronic device. For example, an electronic eyewear device may interact with a communication application such as the Snapchat application available from Snap, Inc. of Santa Monica, California. In such a configuration, the communication application may be implemented on a mobile device to unlock certain functionality like syncing lenses and sending communications that may be communicated to the electronic eyewear device for presentation to the viewing area of the electronic eyewear device. To properly validate key user flows in such a system, an automated test infrastructure was developed that may run a test using multiple physical devices (in the example, the electronic eyewear device and the mobile device) and software platforms (in the example, the operating system of the communication application and the operating system of the mobile device).

Many different development teams may test their scenarios using the test infrastructure. Previously, a well-supported way to interface with the operating system of a communication application is to write tests in the Python programming language in the firmware/operating system repository or to write Python scripts interfacing with a database and nRF shell of the BLUETOOTH® Nordic Universal Asynchronous Receiver Transmitter (UART) Service shell transport that allows the system to receive shell commands remotely over BLUETOOTH®. However, this is not a sustainable or scalable way for development teams to test against the operating systems of the communication applications running on the mobile devices. Respective development teams for a communication application write in a variety of different languages and have established workflows that they prefer to keep. Their code may reside in different repositories; they may have different preferred workflows and frameworks to use for testing; and they may be interested in different scenarios. Also, the development teams each may have different languages for test harnesses and tenancies and test logic, where the test harnesses and tenancies are the set of scripts that actually run on the host machine that is responsible for wrapping test execution and providing things like environment setup, reporting, retries, etc., and where the test logic is the actual test execution and validation of behavior.

In scenarios for wearable electronic devices that communicate with at least one of a mobile device or a server (or proxy server) to support functionality, multi-device user flows may need to be tested. For example, it may be desirable to test pairing of the electronic eyewear device with a communications application (such as a Snapchat app available from Snap, Inc., of Santa Monica, California) using BLUETOOTH® or to test transfer of media from the electronic eyewear device to the communications application (e.g., sending of Snaps from a Snapchat app). End to end user flows such as pairing and transfer may require interaction between the communications application and the electronic eyewear device. This disclosure outlines a solution to the pairing user flow that provides a testing infrastructure that provides low level commands for code testing for pairing tests where a communication application on a mobile device and a communication application on electronic eyewear devices look for other devices at the same time and choose to connect with the correct device having the adequate signal strength. In addition, manual functions, such as button press commands, may be automated to fully automate the pairing process. However, it will be appreciated by those skilled in the art that this same infrastructure also may be used to validate other user flows such as transfer with slight modifications to the test. The disclosed system is further designed to enable testing of a device such as an electronic eyewear device in the computing language and operating system environment of choice.

In addressing these issues, this disclosure is directed to a testing system that includes a client library that functions as a proxy for remote procedure calls to allow commands to be issued directly from a test framework including an interface that enables remote procedure call commands to be sent to a device under test from a mobile device and responses from the device under test to be received and forwarded to the mobile device, even where the mobile device and device under test have different operating systems. A client program adapted to run on the device under test sends and receives remote procedure call commands from the device under test to and from a test server that implements the test framework and manages a device state of the device under test. In a pairing test, the remote procedure call commands include commands adapted to emulate a button press for initiating pairing between the mobile device and the device under test.

This disclosure is further directed to a method of testing interactions between a mobile device and a device under test. The method includes downloading to a test server an operating system master for the mobile device and a version of an operating system running a communication application on the device under test. The device under test is booted to start receiving remote procedure call commands at least one wireless circuit of the device under test. The remote procedure call commands are executed to generate a test between the mobile device and the device under test. In sample configurations, the remote procedure call commands include commands adapted to emulate user activity for initiating interactions between the mobile device and the device under test. Results of the interactions initiated by the emulated user activity are measured. In sample configurations, the remote procedure call commands are adapted to generate a pairing test between the mobile device and the device under test, and the remote procedure call commands include commands adapted to emulate a button press command from at least one of the mobile device or the device under test for initiating a pairing process. In sample configurations, a client program loaded into the device under test sends the emulated button press command to the test server, which sends the emulated button press command to the device under test to initiate pairing between the mobile device and the device under test.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. Sample electronic eyewear devices that may be tested in sample configurations of the automated testing platform will be described with respect to FIGS. 1-3, while the remainder of the testing system will be described with respect to FIGS. 4-11.

Figure 2A:
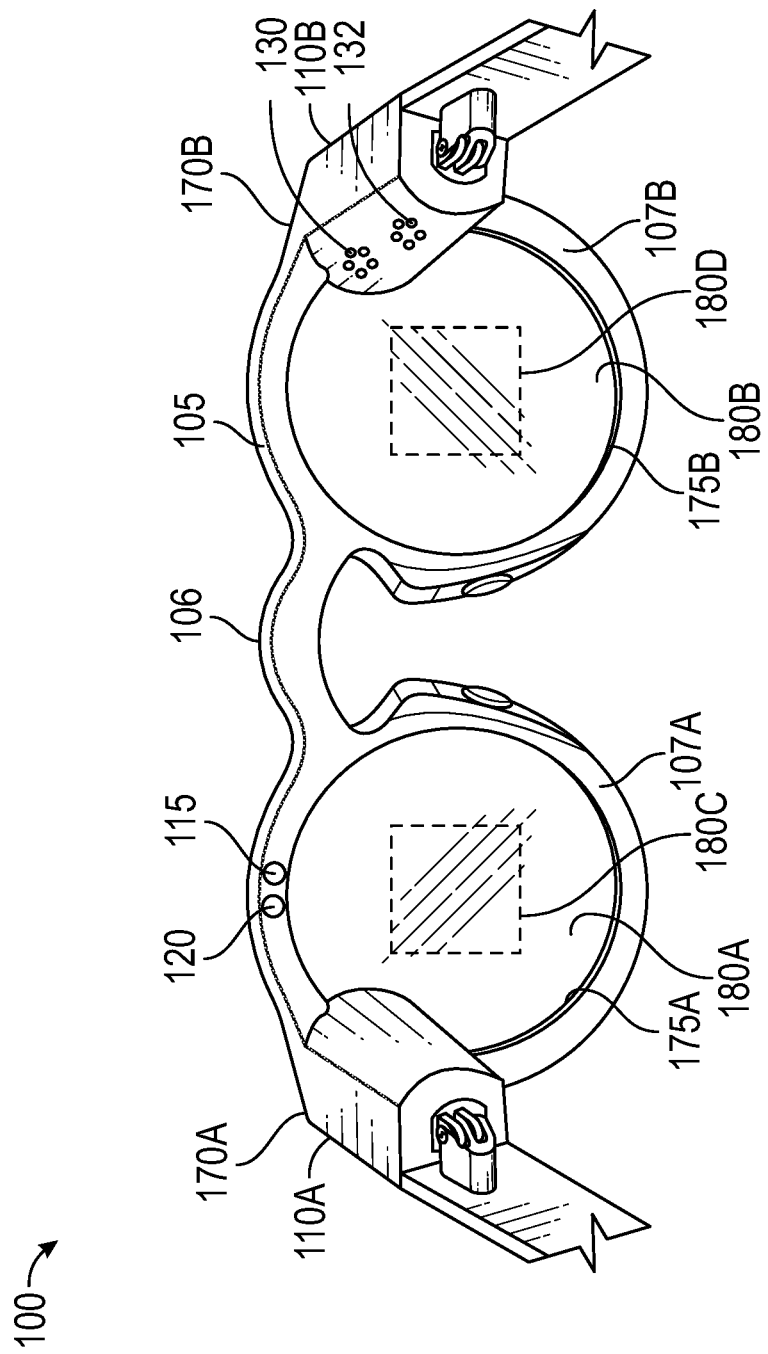
FIG. 2A illustrates a rear view of an example hardware configuration of an electronic eyewear device in an example hardware configuration.

FIG. 1A illustrates a side view of an example hardware configuration of an electronic eyewear device 100 including a right optical assembly 180B with an image display 180D (FIG. 2A). Electronic eyewear device 100 includes multiple visible light cameras 114A-B that form a stereo camera, of which the right visible light camera 114B is located on a right temple 110B and the left visible light camera 114A is located on a left temple 110A.

The left and right visible light cameras 114A-B may include an image sensor that is sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B may be captured along with geolocation data, digitized by an image processor, and stored in a memory.

To provide stereoscopic vision, visible light cameras 114A-B may be coupled to an image processor (element 312 of FIG. 3) for digital processing along with a timestamp in which the image of the scene is captured. Image processor 312 may include circuitry to receive signals from the visible light camera 114A-B and to process those signals from the visible light cameras 114A-B into a format suitable for storage in the memory (element 334 of FIG. 3). The timestamp may be added by the image processor 312 or other processor that controls operation of the visible light cameras 114A-B. Visible light cameras 114A-B allow the stereo camera to simulate human binocular vision. Stereo cameras also provide the ability to reproduce three-dimensional images based on two captured images from the visible light cameras 114A-B, respectively, having the same timestamp. Such three-dimensional images 515 allow for an immersive life-like experience, e.g., for virtual reality or video gaming. For stereoscopic vision, the pair of images 558A-B may be generated at a given moment in time—one image for each of the left and right visible light cameras 114A-B. When the pair of generated images 558A-B from the frontward facing field of view (FOV) 111A-B of the left and right visible light cameras 114A-B are stitched together (e.g., by the image processor 312), depth perception is provided by the optical assembly 180A-B.

In an example, the electronic eyewear device 100 includes a frame 105, a right rim 107B, a right temple 110B extending from a right lateral side 170B of the frame 105, and a see-through image display 180D (FIGS. 2A-B) comprising optical assembly 180B to present a graphical user interface to a user. The electronic eyewear device 100 includes the left visible light camera 114A connected to the frame 105 or the left temple 110A to capture a first image of the scene. Electronic eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, a processor 332 (FIG. 3) is coupled to the electronic eyewear device 100 and connected to the visible light cameras 114A-B and memory 334 (FIG. 3) accessible to the processor 332, and programming in the memory 334 may be provided in the electronic eyewear device 100 itself.

Figure 1B:
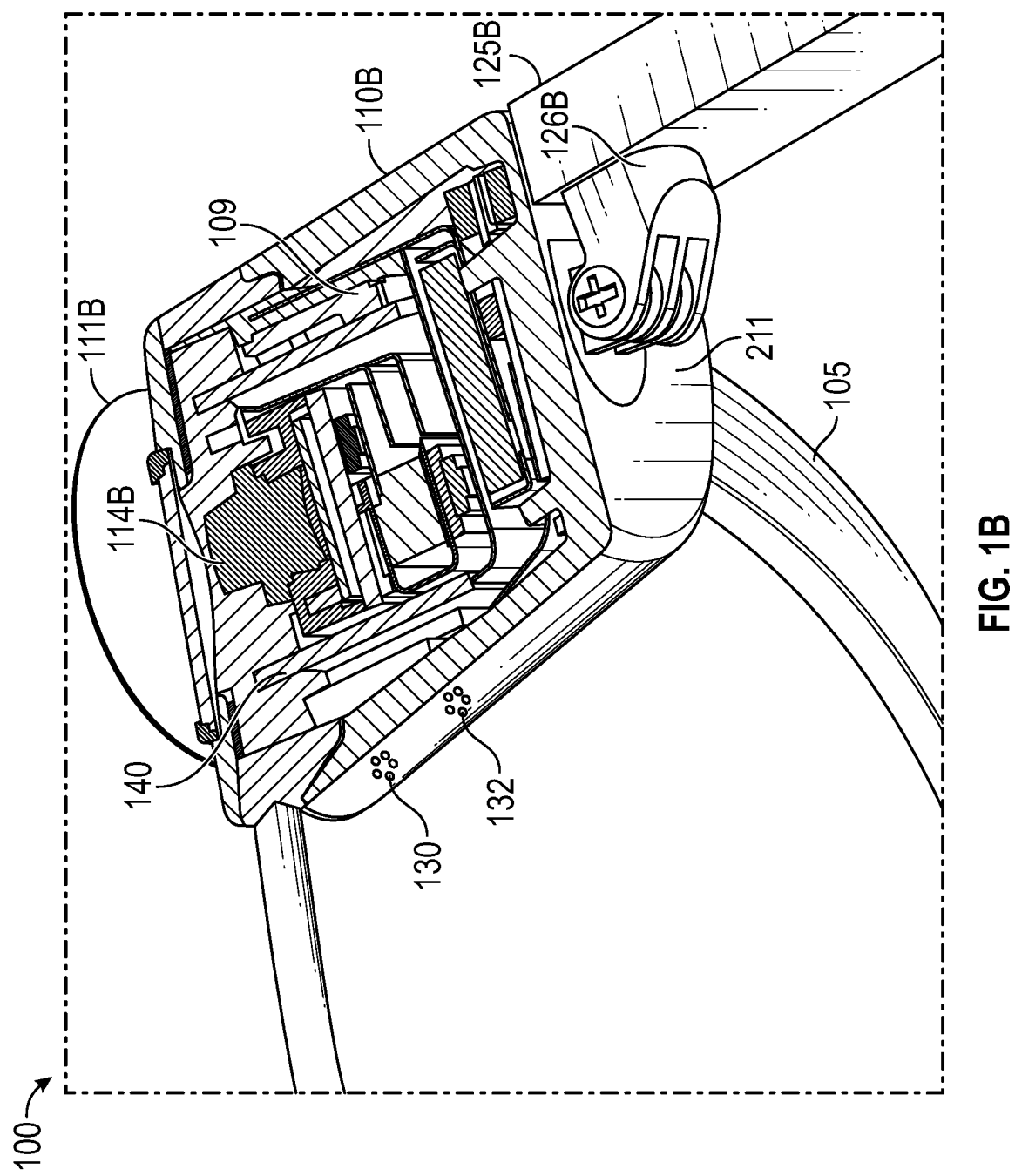
FIG. 1B illustrates a top cross-sectional view of a temple of the electronic eyewear device of FIG. 1A.
Figure 2B:
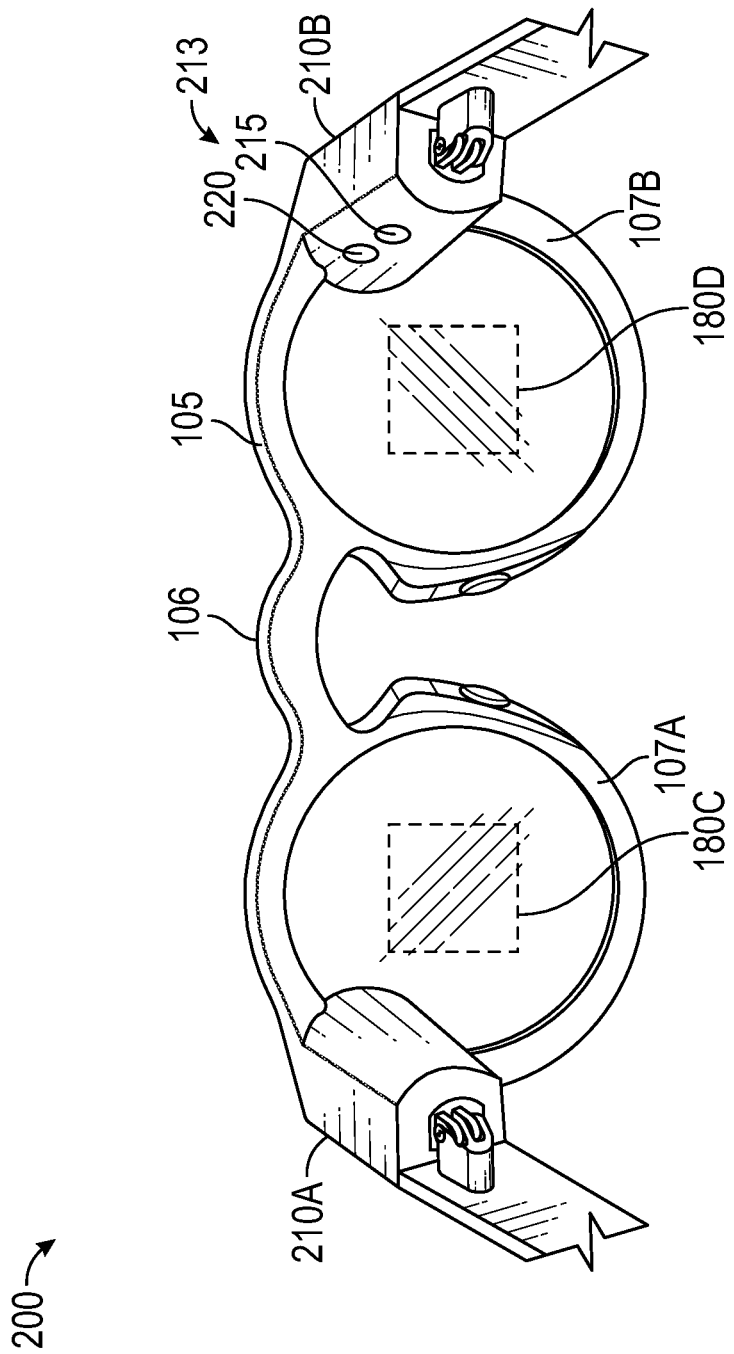
FIG. 2B illustrates a rear view of an example hardware configuration of another electronic eyewear device in an example hardware configuration.
Figure 2C:
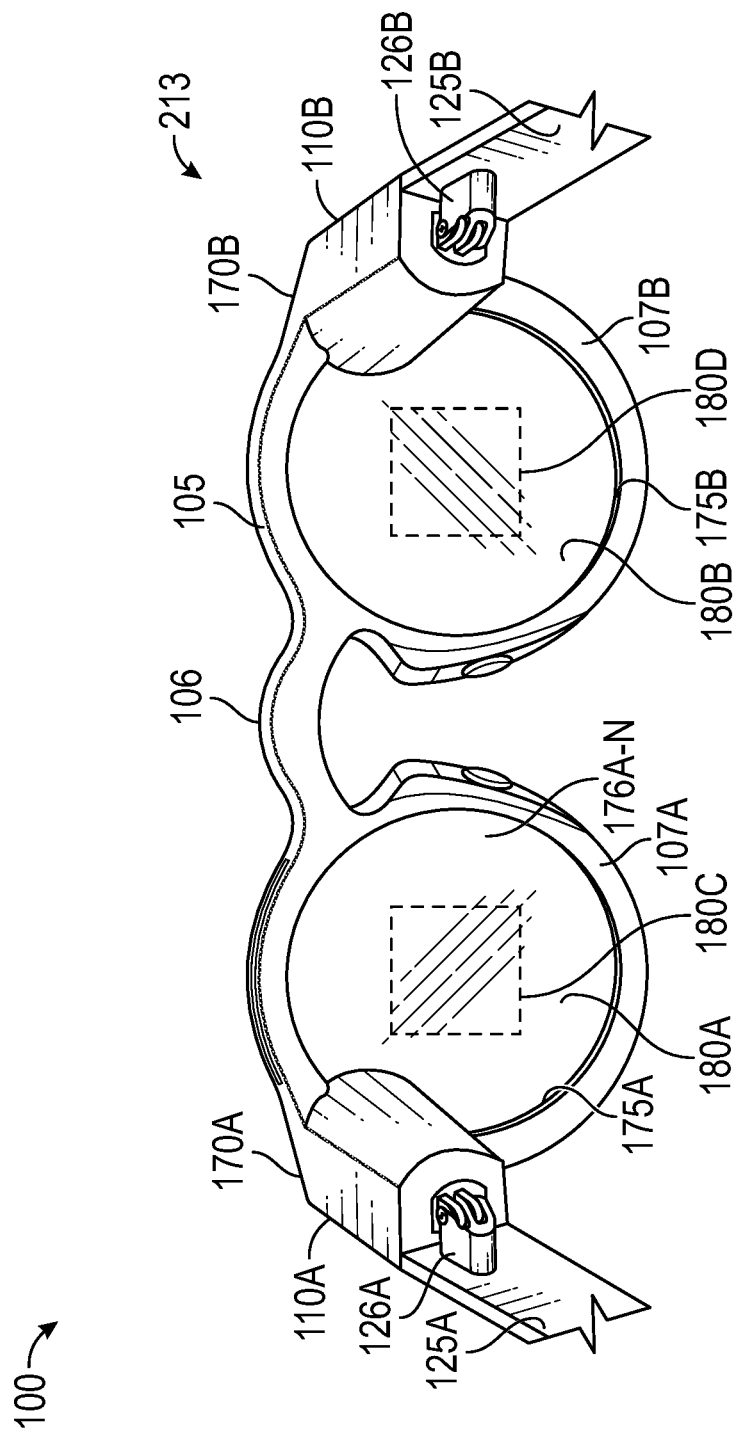
FIG. 2C and FIG. 2D illustrate rear views of example hardware configurations of an electronic eyewear device including two different types of image displays.

Although not shown in FIG. 1A, the electronic eyewear device 100 also may include a head movement tracker (element 109 of FIG. 1B) or an eye movement tracker (element 113 of FIG. 2A or element 213 of FIGS. 2B-C). Electronic eyewear device 100 may further include the see-through image displays 180C-D of optical assembly 180A-B, respectfully, for presenting a sequence of displayed images, and an image display driver (element 342 of FIG. 3) coupled to the see-through image displays 180C-D of optical assembly 180A-B to control the image displays 180C-D of optical assembly 180A-B to present the sequence of displayed images 515, which are described in further detail below. Electronic eyewear device 100 may further include the memory 334 and the processor 332 having access to the image display driver 342 and the memory 334, as well as programming in the memory 334. Execution of the programming by the processor 332 configures the electronic eyewear device 100 to perform functions, including functions to present, via the see-through image displays 180C-D, an initial displayed image of the sequence of displayed images, the initial displayed image having an initial field of view corresponding to an initial head direction or an initial eye gaze direction.

Execution of the programming by the processor 332 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B-C), an eye movement of an eye of the user of the electronic eyewear device 100. Execution of the programming by the processor 332 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 332 may further configure the electronic eyewear device 100 to generate a successive displayed image of the sequence of displayed images based on the field of view adjustment. Execution of the programming by the processor 332 may further configure the electronic eyewear device 100 to present, via the see-through image displays 180C-D of the optical assembly 180A-B, the successive displayed images.

FIG. 1B illustrates a top cross-sectional view of the temple of the electronic eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A (FIG. 2A). As shown, the electronic eyewear device 100 includes the right visible light camera 114B and a circuit board, which may be a flexible printed circuit board (PCB)

140. The right hinge 126B connects the right temple 110B to hinged arm 125B of the electronic eyewear device 100. In some examples, components of the right visible light camera 114B, the flexible PCB 140, or other electrical connectors or contacts may be located on the right temple 110B or the right hinge 126B.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user may further include determining the variation of head direction based on both the initial head direction and the successive head direction. Detecting movement of the user of the electronic eyewear device 100 may further include in response to tracking, via the head movement tracker 109, the head movement of the head of the user, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means ±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110B includes temple body 211 and a temple cap, with the temple cap omitted in the cross-section of FIG. 1B. Disposed inside the right temple 110B are various interconnected circuit boards, such as PCBs or flexible PCBs 140, that include controller circuits for right visible light camera 114B, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The right visible light camera 114B is coupled to or disposed on the flexible PCB 140 and covered by a visible light camera cover lens, which is aimed through opening(s) formed in the right temple 110B. In some examples, the frame 105 connected to the right temple 110B includes the opening(s) for the visible light camera cover lens. The frame 105 may include a front-facing side configured to face outwards away from the eye of the user. The opening for the visible light camera cover lens may be formed on and through the front-facing side. In the example, the right visible light camera 114B has an outward facing angle of coverage 111B with a line of sight or perspective of the right eye of the user of the electronic eyewear device 100. The visible light camera cover lens also can be adhered to an outward facing surface of the right temple 110B in which an opening is formed with an outwards facing angle of coverage, but in a different outwards direction. The coupling can also be indirect via intervening components.

Left (first) visible light camera 114A may be connected to the left see-through image display 180C of left optical assembly 180A to generate a first background scene of a first successive displayed image. The right (second) visible light camera 114B may be connected to the right see-through image display 180D of right optical assembly 180B to generate a second background scene of a second successive displayed image. The first background scene and the second background scene may partially overlap to present a three-dimensional observable area of the successive displayed image.

Flexible PCB 140 may be disposed inside the right temple 110B and coupled to one or more other components housed in the right temple 110B. Although shown as being formed on the circuit boards 140 of the right temple 110B, the right visible light camera 114B can be formed on the circuit boards 140 of the left temple 110A, the hinged arms 125A-B, or frame 105.

FIG. 2A illustrates a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the electronic eyewear device 100 can include other arrangements, such as a single optical element depending on the application or intended user of the electronic eyewear device 100. As further shown, electronic eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into hinged arms 125A-B attached to the frame 105.

In the example of FIG. 2A, an eye scanner 113 may be provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107A. The frame 105 or one or more of the left and right temples 110A-B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107B, or in different locations on the frame 105. For example, the infrared emitter 115 may be on the left rim 107A and the infrared camera 120 may be on the right rim 107B. In another example, the infrared emitter 115 may be on the frame 105 and the infrared camera 120 may be on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 may be arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temples 110A-B at either ends of the frame 105.

FIG. 2B illustrates a rear view of an example hardware configuration of another electronic eyewear device 200. In this example configuration, the electronic eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a left rim 107A which is connected to a right rim 107B via a bridge 106. The left and right rims 107A-B may include respective apertures which hold the respective optical elements 180A-B comprising the see-through display 180C-D.

Figure 2D:
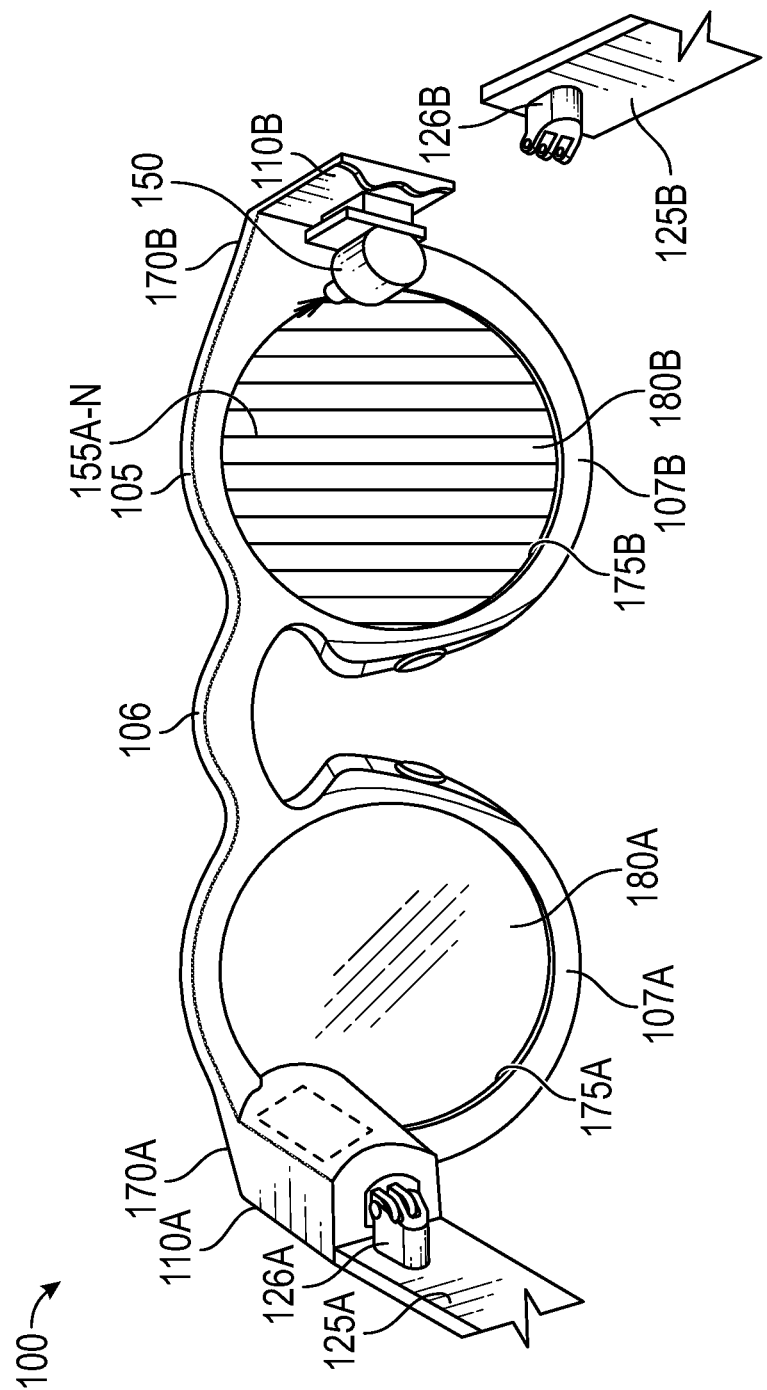

FIGS. 2C-D illustrate rear views of example hardware configurations of the electronic eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N may extend over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B may include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 110A-B of the electronic eyewear device 100. Optical assembly 180-B may include one or more optical strips 155A-N spaced apart across the width of the lens of the optical assembly 180A-B or across a depth of the lens between the front surface and the rear surface of the lens.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls optical strips 155A-N by initiating mechanical, acoustic, or electromagnetic signals. Although shown as having two optical assemblies 180A-B, the electronic eyewear device 100 can include other arrangements, such as a single or three optical assemblies, or the optical assembly 180A-B may have arranged different arrangement depending on the application or intended user of the electronic eyewear device 100.

As further shown in FIGS. 2C-D, electronic eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into the hinged arms 125A-B attached to the frame 105.

In one example, the see-through image displays include the first see-through image display 180C and the second see-through image display 180D. Electronic eyewear device 100 may include first and second apertures 175A-B that hold the respective first and second optical assembly 180A-B. The first optical assembly 180A may include the first see-through image display 180C (e.g., a display matrix of FIG. 2C or optical strips 155A-N' and a projector 150A (not shown) in left temple 110A). The second optical assembly 180B may include the second see-through image display 180D (e.g., a display matrix of FIG. 2C or optical strips 155A-N" and a projector 150B (not shown) in right temple 110B). The successive field of view of the successive displayed image may include an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
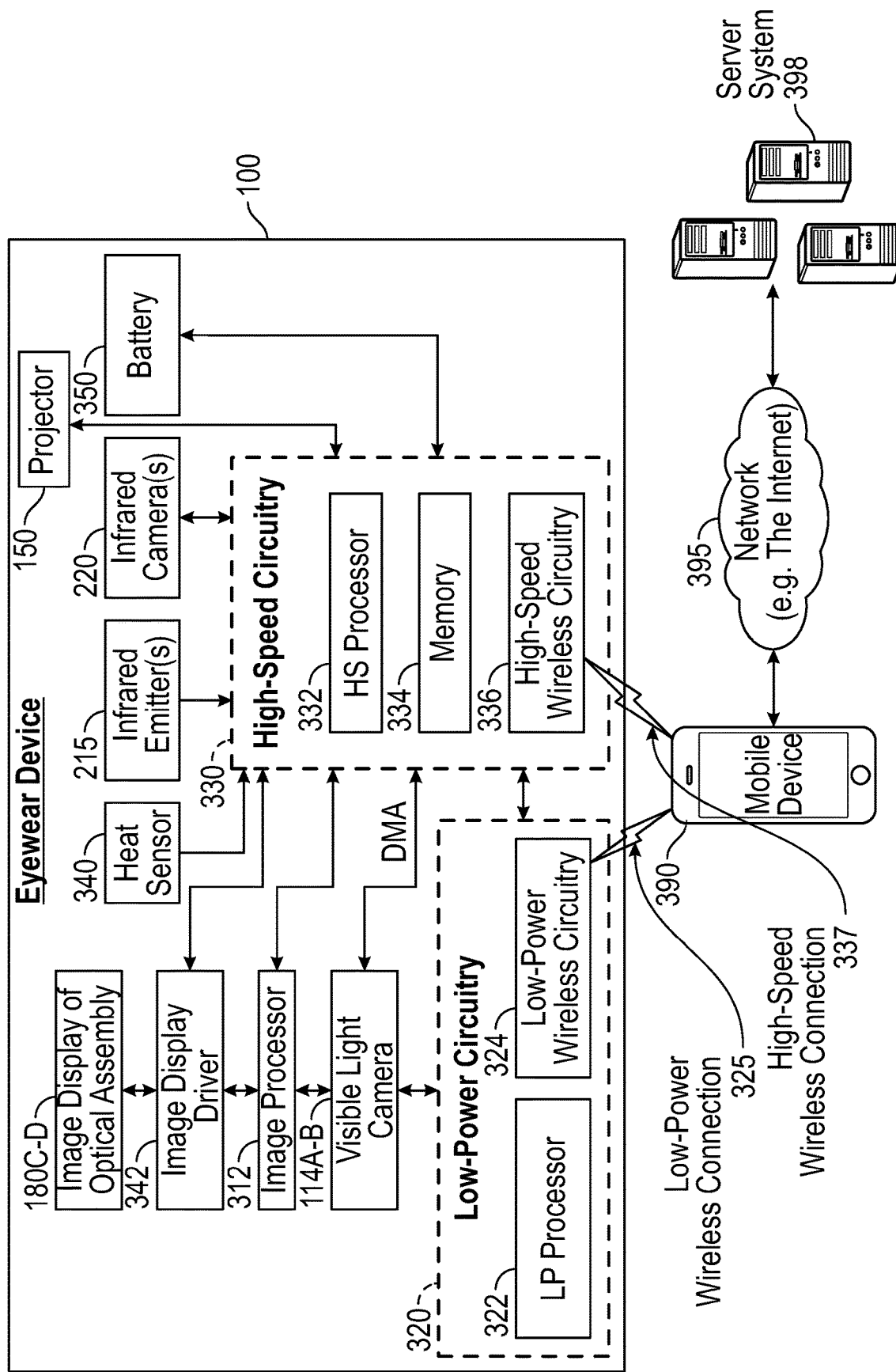
FIG. 3 illustrates a block diagram of electronic components of the electronic eyewear device.

FIG. 3 illustrates a high-level functional block diagram including example electronic components disposed in electronic eyewear device 100 or 200. The illustrated electronic components include the processor 332, the memory 334, and the see-through image display 180C and 180D.

Memory 334 includes instructions for execution by processor 332 to implement the functionality of electronic eyewear devices 100 and 200, including instructions for processor 332 to control in the resulting image. Processor 332 receives power from battery 350 and executes the instructions stored in memory 334, or integrated with the processor 332 on-chip, to perform the functionality of electronic eyewear devices 100 and 200 and to communicate with external devices via wireless connections.

The electronic eyewear devices 100 and 200 may incorporate an eye movement tracker (e.g., shown as infrared emitter 215 and infrared camera 220 in FIG. 2B) and may provide user interface adjustments via a mobile device 390 and a server system 398 connected via various networks. Mobile device 390 may be a smartphone, tablet, laptop computer, access point, or any other such device capable of connecting with the electronic eyewear devices 100 or 200 using both a low-power wireless connection 325 and a high-speed wireless connection 337. Mobile device 390 is further connected to server system 398 via a network 395. The network 395 may include any combination of wired and wireless connections.

Electronic eyewear devices 100 and 200 may include at least two visible light cameras 114A-B (one associated with the left lateral side 170A and one associated with the right lateral side 170B). Electronic eyewear devices 100 and 200 further include two see-through image displays 180C-D of the optical assembly 180A-B (one associated with the left lateral side 170A and one associated with the right lateral side 170B). Electronic eyewear devices 100 and 200 also include image display driver 342, image processor 312, low-power circuitry 320, and high-speed circuitry 330. The components shown in FIG. 3 for the electronic eyewear devices 100 and 200 are located on one or more circuit boards, for example, a PCB or flexible PCB 140, in the temples. Alternatively, or additionally, the depicted components can be located in the temples, frames, hinges, hinged arms, or bridge of the electronic eyewear devices 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming implements the user interface field of view adjustment instructions, including instructions to cause the electronic eyewear devices 100 or 200 to track, via the eye movement tracker 213, the eye movement of the eye of the user of the electronic eyewear devices 100 or 200. Other implemented instructions (functions) cause the electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 342 to present the sequence of displayed images, including the initial displayed image with the initial field of view and the successive displayed image with the successive field of view.

As shown in FIG. 3, high-speed circuitry 330 includes high-speed processor 332, memory 334, and high-speed wireless circuitry 336. In the example, the image display driver 342 is coupled to the high-speed circuitry 330 and operated by the high-speed processor 332 in order to drive the left and right image displays 180C-D of the optical assembly 180A-B. High-speed processor 332 may be any processor capable of managing high-speed communications and operation of any general computing system needed for electronic eyewear device 100 or 200. High-speed processor 332 includes processing resources needed for managing high-speed data transfers on high-speed wireless connection 337 to a wireless local area network (WLAN) using high-speed wireless circuitry 336. In certain examples, the high-speed processor 332 executes an operating system such as a LINUX operating system or other such operating system of the electronic eyewear device 100 or 200 and the operating system is stored in memory 334 for execution. In addition to any other responsibilities, the high-speed processor 332 executing a software architecture for the electronic eyewear device 100 or 200 is used to manage data transfers with high-speed wireless circuitry 336. In certain examples, high-speed wireless circuitry 336 is configured to implement Institute of Electrical and Electronic Engineers (IEEE) 802.11 communication standards, also referred to herein as WI-FI®. In other examples, other high-speed communications standards may be implemented by high-speed wireless circuitry 336.

Low-power wireless circuitry 324 and the high-speed wireless circuitry 336 of the electronic eyewear devices 100 and 200 can include short range transceivers (BLUETOOTH®) and wireless wide, local, or wide area network transceivers (e.g., cellular or WI-FI®). Mobile device 390, including the transceivers communicating via the low-power wireless connection 325 and high-speed wireless connection 337, may be implemented using details of the architecture of the electronic eyewear device 100 and 200, as can other elements of network 395.

Memory 334 includes any storage device capable of storing various data and applications, including, among other things, color maps, camera data generated by the left and right visible light cameras 114A-B and the image processor 312, as well as images generated for display by the image display driver 342 on the see-through image displays 180C-D of the optical assembly 180A-B. While memory 334 is shown as integrated with high-speed circuitry 330, in other examples, memory 334 may be an independent stand-alone element of the electronic eyewear device 100 or 200. In certain such examples, electrical routing lines may provide a connection through a system on chip that includes the high-speed processor 332 from the image processor 312 or low-power processor 322 to the memory 334. In other examples, the high-speed processor 332 may manage addressing of memory 334 such that the low-power processor 322 will boot the high-speed processor 332 any time that a read or write operation involving memory 334 is needed.

Server system 398 may be one or more computing devices as part of a service or network computing system, for example, that includes a processor, a memory, and network communication interface to communicate over the network 395 with the mobile device 390 and electronic eyewear devices 100 and 200. For example, the electronic eyewear devices 100 or 200 may be paired with the mobile device 390 via the high-speed wireless connection 337 or directly to the server system 398 via the network 395.

Output components of the electronic eyewear devices 100 and 200 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 342. The output components of the electronic eyewear devices 100 and 200 further include acoustic components (e.g., speakers), haptic components (e.g., a vibratory motor), other signal generators, and so forth. The input components of the electronic eyewear devices 100 and 200, the mobile device 390, and server system 398 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear devices 100 and 200 may optionally include additional peripheral device elements such as ambient light and spectral sensors, biometric sensors, heat sensor 340, or other display elements integrated with electronic eyewear device 100 or 200. For example, the peripheral device elements may include any I/O components including output components, motion components, position components, or any other such elements described herein. The electronic eyewear devices 100 and 200 can take other forms and may incorporate other types of frameworks, for example, a headgear, a headset, or a helmet.

For example, the biometric components of the electronic eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 325 and 337 from the mobile device 390 via the low-power wireless circuitry 324 or high-speed wireless circuitry 336.

Figure 4:
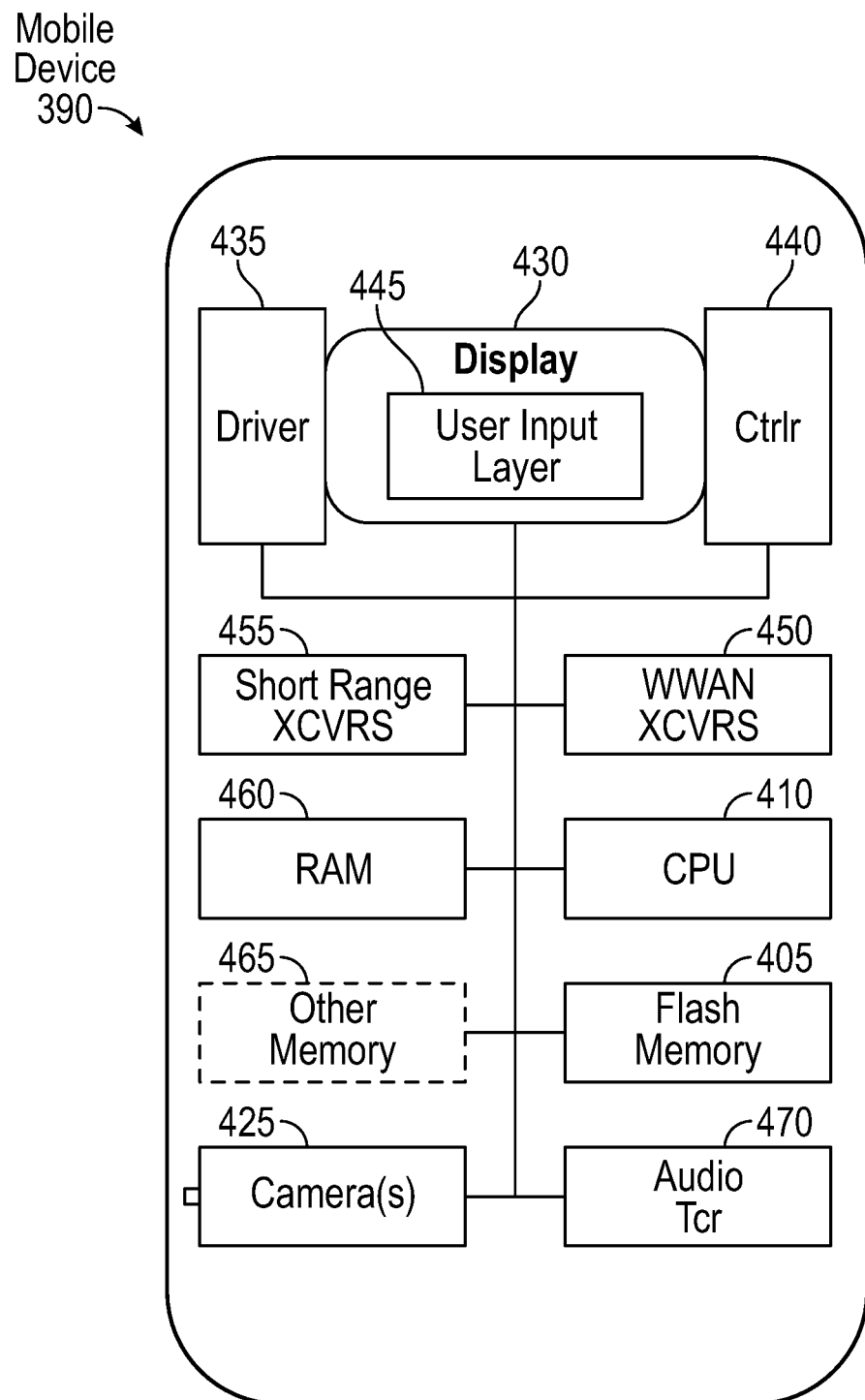
FIG. 4 illustrates a sample configuration of a mobile device for use with an electronic eyewear device in a sample configuration.

FIG. 4 illustrates a high-level functional block diagram of an example mobile device 390. Mobile device 390 may include a flash memory 405 that stores programming to be executed by the CPU 410 to perform all or a subset of the functions of the mobile device 390. The mobile device 390 may further include a camera 425 that comprises one or more visible-light cameras (first and second visible-light cameras with overlapping fields of view) or at least one visible-light camera and a depth sensor with substantially overlapping fields of view. Flash memory 405 may further include multiple images or video, which are generated via the camera 425.

The mobile device 390 may further include an image display 430, a mobile display driver 435 to control the image display 430, and a display controller 440. In the example of FIG. 4, the image display 430 may include a user input layer 445 (e.g., a touchscreen) that is layered on top of or otherwise integrated into the screen used by the image display 430. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 390 with a user interface that includes a touchscreen input layer 445 for receiving input (by touch, multi-touch, or gesture, and the like, by hand, stylus, or other tool) and an image display 430 for displaying content.

As shown in FIG. 4, the mobile device 390 may include at least one digital transceiver (XCVR) 450, shown as WWAN XCVRs, for digital wireless communications via a wide-area wireless mobile communication network. The mobile device 390 also may include additional digital or analog transceivers, such as short-range transceivers (XCVRs) 455 for short-range network communication, such as via NFC, VLC, DECT, ZigBee, BLUETOOTH® or WI-FI®. For example, short range XCVRs 455 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 390, the mobile device 390 also may include a global positioning system (GPS) receiver. Alternatively, or additionally, the mobile device 390 may utilize either or both the short range XCVRs 455 and WWAN XCVRs 450 for generating location coordinates for positioning. For example, cellular network, WI-FI®, or BLUETOOTH® based positioning systems may generate very accurate location coordinates, particularly when used in combination. Such location coordinates may be transmitted to the mobile device 390 over one or more network connections via XCVRs 450, 455.

The transceivers 450, 455 (i.e., the network communication interface) may conform to one or more of the various digital wireless communication standards utilized by modern mobile networks. Examples of WWAN transceivers 450 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 450, 455 provide two-way wireless communication of information including digitized audio signals, still image and video signals, web page information for display as well as web-related inputs, and various types of mobile message communications to/from the mobile device 390.

The mobile device 390 may further include a microprocessor that functions as the central processing unit (CPU) 410. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 410. The CPU 410, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 410 or processor hardware in smartphone, laptop computer, and tablet.

The CPU 410 serves as a programmable host controller for the mobile device 390 by configuring the mobile device 390 to perform various operations, for example, in accordance with instructions or programming executable by CPU 410. For example, such operations may include various general operations of the mobile device 390, as well as operations related to the programming for the communication application including features such as Memories, Lens, and Scan described herein. Although a processor may be configured by use of hardwired logic, typical processors in mobile devices are general processing circuits configured by execution of programming.

The mobile device 390 further includes a memory or storage system, for storing programming and data. In the example shown in FIG. 4, the memory system may include flash memory 405, a random-access memory (RAM) 460, and other memory components 465, as needed. The RAM 460 may serve as short-term storage for instructions and data being handled by the CPU 410, e.g., as a working data processing memory. The flash memory 405 typically provides longer-term storage.

Hence, in the example of mobile device 390, the flash memory 405 may be used to store programming or instructions for execution by the CPU 410. Depending on the type of device, the mobile device 390 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 590 may include an audio transceiver 470 that may receive audio signals from the environment via a microphone (not shown) and provide audio output via a speaker (not shown). Audio signals may be coupled with video signals and other messages by a messaging application or social media application implemented on the mobile device 390.

Automated Testing Platform

For the reasons noted above, a testing infrastructure is desired to validate pairing user flows as well as to validate other user flows such as data transfer with slight modifications to the test. A testing infrastructure is also desired to enable testing of a device such as an electronic eyewear device in the computing language and operating system environment of choice.

The existing client test frameworks, including backend services for functional test queuing and management, typically permit testing by the communications application of user interface flows. The infrastructure described herein expands upon the existing test frameworks to test multiple devices for validating the pairing user flows as well as other flows. Such user flows are more complicated in that a mechanism is needed to manage state on the electronic eyewear device, for example.

In a sample configuration of the test infrastructure, firmware and operating system code is provided in a repository for the electronic eyewear device. In a sample configuration, a test library may be stored in a Python package that provides abstractions for the low-power wireless circuitry 324, the high-speed wireless circuitry 336, power measurements, metrics upload, etc. This test library may be the central location for all test bindings to the operating system code for the electronic eyewear device 100 and the mobile device 390, for example. A test harness may be written in Python and test logic may be written in Python in a sample configuration. In practice, most of the test logic invokes calls to the low-power wireless circuitry 324 (e.g., a Nordic UART Service chip) or high-speed wireless circuitry 336 (e.g., a BLUETOOTH® sensor hub chip) via a shell interface. There are a number of Python packages that may be published and reused for this purpose. In a particular example, pairing flows for a mobile device 390 and an electronic eyewear device 100 of the types described herein may include an Xcode build of a user interface test on the test infrastructure. The pairing flow would test the software and provide metrics for measuring a successful (or unsuccessful) pairing.

The firmware and operating system code for the communications application of the mobile device 390 supporting the electronic eyewear device 100 may be provided in a repository for the mobile device 390, specifically in the communication application portion of the mobile device repository. A test harness may be written in Python and the test logic may be written in at least one of Java or Kotlin programming languages in an example. The Kotlin programming language supports native compilation across multiple platforms, including the main use cases of the standard mobile device operating systems (e.g., iOS and Android). A shared native interface may be written in Kotlin native and shared across many platforms. Those skilled in the art will appreciate that the device state of the BLUETOOTH® sensor hub chip may be manipulated as part of the application programming interface (API); however, there is no way to easily issue button commands to the Nordic UART Service chip. As will be explained below, another mechanism is provided to issue automated button commands to the Nordic UART Service chip as part of the testing scenarios.

The code for an operating system client for the communications application may be provided in another repository. This operating system client enables communications with a test server. The same test harness may be used as was used for the communications application along with the associated test logic. In a sample test configuration, the code for the operating system client may run on a mobile device connected to a test server via a universal serial bus (USB). In sample configurations, the test may test pairing and transfer flows from an operating system perspective.

Code for the communication application's backend services in the cloud may be provided in a variety of repositories and written in a variety of languages. In some scenarios (such as the over-the-air (OTA) backend), it may be desired to test the OTA updates under a variety of network conditions requiring manipulation of device state both inter- and intra-test.

The design for the test infrastructure allows all development teams involved with the device under test to target tests using their preferred workflow and to reuse existing test solutions when possible while keeping maintenance costs low. The test infrastructure incorporates a shared, cross platform client library that is used for general device interfacing during testing. The client library may span multiple layers of the software stack. In a sample configuration, a server running on an automation (or local) machine is exposed to provide access to an existing interface for the electronic eyewear device 100 that is to be used during firmware tests. A shared client may be implemented in C++ or some other language and consumed in the mobile device's operating system with the ability to hit the server. C++ is desirable for sharing code across clients, which is desirable in a test environment. The test runs may be adjusted to pass a runtime variable to the system tests containing the test server universal resource identifier (URI).

In a sample configuration, the client library of the test server is provided in an automation repository. This client library will expose the bindings and functionality from the repository of the electronic eyewear device 100 via a gRPC service that is deployed across all automation workers and is the main entry point for the electronic eyewear device's tenancy. As used herein, gRPC refers to an open source Remote Procedure Call (RPC) framework that allows direct calls to a method on the test server as if the method were a local object. The test server implements the interface and methods that allow users to send commands to the device under test (DUT) and to receive a response. The client runs on the mobile device and has a stub that provides the same methods as the test server. Using this client/server model allows state to be managed by sending commands directly from the client running on the mobile device to the test server that runs the commands on the DUT. The use of gRPC is particularly desirable for networked solutions for managing a device state on another node.

The test server's client may be maintained in a client repository as a C++ implementation of a gRPC client that is installed in the device under test to allow the user to hit the test server and parse results. The communication application and mobile device operating system software repositories may be used to import and call the C++ client in a test compilation, which allows a user to issue gRPC calls back to a gRPC server of the test server from the C++ client of the device under test (e.g., electronic eyewear device 100).

Also, a mobile device test harness may need to be modified so that testing jobs routed through the backend can pass runtime parameters to the device under test. Mobile device operating system tests have an established pattern of passing environment variables as part of a test execution.

Figure 5:
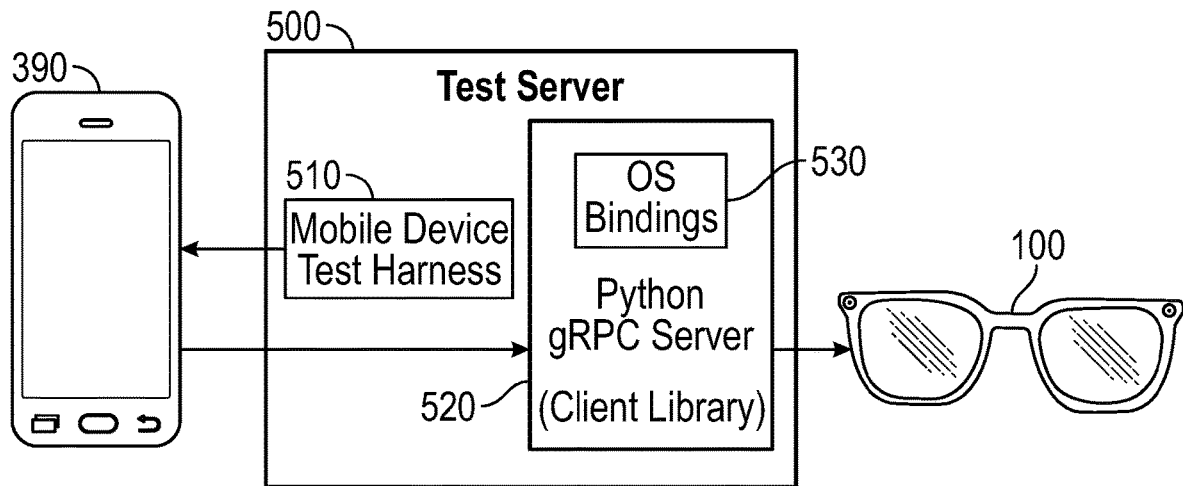
FIG. 5 illustrates a sample testing configuration for testing a pairing solution for pairing of a mobile device with an electronic eyewear device.

FIG. 5 illustrates a sample testing configuration for testing a pairing solution for pairing of a mobile device 390 with an electronic eyewear device 100. The testing configuration includes a test server 500 that implements a mobile device test harness 510 and implements a Python gRPC server 520 including a cross platform client library and operating system (OS) bindings 530 for the communication application running of the mobile device 390. The cross platform client library of the Python gRPC server 520 is built as part of the communication application and functions as a proxy for RPC calls so as to allow gRPC commands to be issued directly from a test framework. The corresponding Python gRPC server 520 runs on the test server 500 with bindings to the electronic eyewear device 100 that enable commands to be issued and state of the electronic eyewear device 100 to be managed. The client library further enables implementation of a multi-device/platform test infrastructure that enables validation of the pairing flow between the electronic eyewear device 100 and the mobile device 390. In sample configurations, the main entry point for the test framework is the mobile device test harness 510 during a test execution.

Since a device testing lab may host a number of testing rigs with attached DUTs (e.g., electronic eyewear device 100), RSSI signal strength may become an issue as all surrounding DUTs would also advertise themselves during the BLUETOOTH® pairing process. In a test environment, this issue may be addressed by placing the pairing rig in a radio frequency (RF) box 600, such as a Ramsey RF box, as shown in FIG. 6 in order to remove radiofrequency interference so as to isolate the electronic eyewear device 100 and to provide reliable signal strength.

Figure 6:
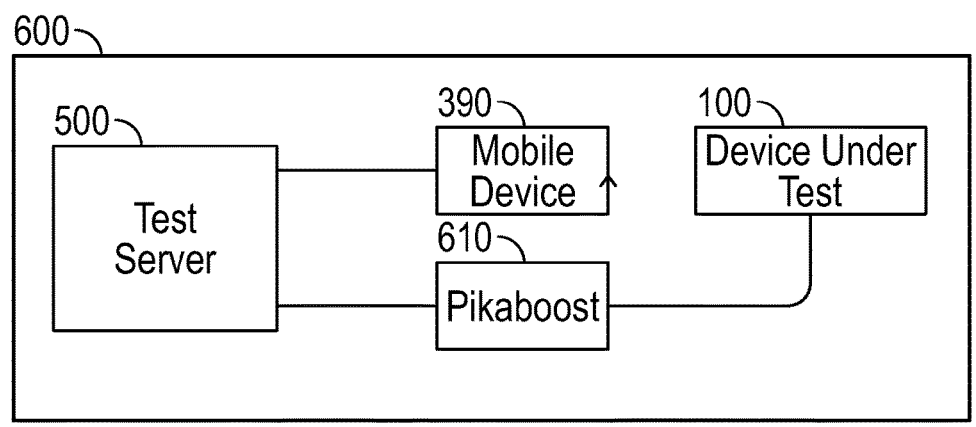
FIG. 6 illustrates a test infrastructure including a test server that runs a testing software stack and allows test execution to be targeted on the mobile device.

As shown in FIG. 6, the test infrastructure may include a test server 500 that runs a testing software stack and allows test execution to be targeted on the mobile device 390. In a sample test for pairing, the mobile device 390 would execute the mobile device's operating systems' pairing test. In the example where the DUT is an electronic eyewear device 100 of the type described above with respect to FIGS. 1-3, a custom PCB (Pikaboost) 610 may also be provided to charge and manage the DUT through hardwired UART serial interfaces. For example, the Pikaboost 610 may provide customized serialized bindings to the low-power wireless circuitry 324 (e.g., Nordic UART Service chip) or high-speed wireless circuitry 336 (e.g., BLUETOOTH® sensor hub chip) of the electronic eyewear device 100 via a USB or USBC serial connection. In particular, the Pikaboost 610 may provide respective hardware communication channels (e.g., USB serial channels) for the gRPC commands to pass to and from the respective chips of low-power wireless circuitry 324 chip and high-speed wireless circuitry 336 chip and the mobile device 390. In a sample configuration, the Pikaboost 610 may split the gRPC communications into two hardware channels—one for the low-power wireless circuitry 324 and one for the high-speed wireless circuitry 336. For example, the Pikaboost 610 may communicate a UART protocol to the electronic eyewear device 100 under test by splitting the communication lines to provide serial communications to the respective wireless circuit chips and to deserialize the commands upon receipt whereby the appropriate low-level gRPC commands may be provided to the respective chips to fully automate the communications routing between the devices being tested for pairing.

Figure 7:
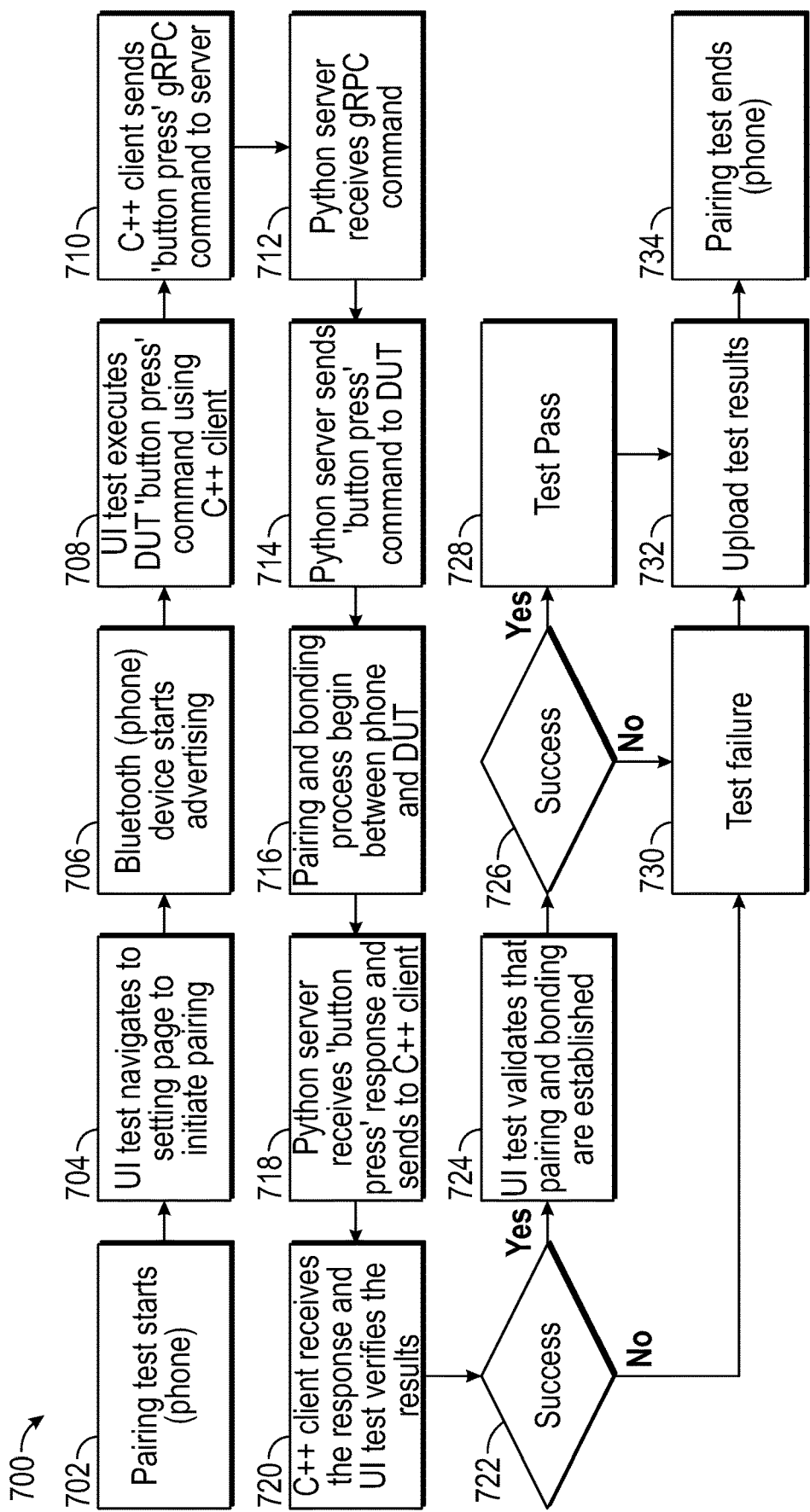
FIG. 7 illustrates a flow chart of a sample pairing flow for a testing infrastructure in a sample configuration.

A sample pairing flow 700 for a testing infrastructure is illustrated in FIG. 7. As illustrated, the pairing test starts at 702 for pairing a mobile device 390 with an electronic eyewear device 100. The automated test apparatus 500 logs in to the communications application running on the mobile device 390 and the user interface test navigates to the settings page of the electronic eyewear device 100 to initiate pairing with the mobile device 390 at 704. The automated test apparatus 500 selects to pair the electronic eyewear device 100 with a new device, and the electronic eyewear device 100 starts advertising via BLUETOOTH® at 706. Similarly, the communications application on the mobile device 390 will look for an electronic eyewear device 100 to pair with via BLUETOOTH®. At 708, the user interface (UI) test executes a "button press" command of the DUT 100 using the C++ client running on the electronic eyewear device (DUT) 100 in the test environment. The "button press" command simulates a button press for a period of time (e.g., 7 seconds) that triggers the pairing of the DUT 100 with a nearby mobile device 390 via BLUETOOTH®. The C++ client sends the mock "button press" as a gRPC command to the automated test apparatus 500 at 710, and the Python gRPC server 520 of the automated test apparatus 500 receives the gRPC command at 712. The Python gRPC server 520 recognizes and sends the "button press" command to the appropriate wireless circuit chip (e.g., Nordic UART Service chip) of the DUT 100 at 714, and the pairing and bonding process begins between the mobile device 390 and the DUT 100 at 716. The Python gRPC server 520 receives the "button press" response and sends a response in the form of a gRPC command to the C++ client running on the DUT 100 at 718. The C++ client receives the response and the UI test verifies the results at 720 indicating a "successful" pairing or an "unsuccessful" pairing.

If the pairing is determined to be successful at 722, the UI test validates that pairing and bonding between the DUT 100 and mobile device 390 has been established at 724. If the pairing and bonding is deemed successful at 726, the result of the test is a "pass" at 728. However, if the pairing is determined to be unsuccessful at 722 or 726, the result of the test is a "failure" at 730. In the case of a "pass" or a "failure," the test results are uploaded at 732, and the pairing test ends at 734. In an example, the test results may include error codes identifying where any errors may have occurred for failed pairings.

From the pairing flow illustrated in FIG. 7, it is apparent that the state of the electronic eyewear device 100 may be managed as part of the pairing test. In the example of FIG. 7, the pairing button of the electronic eyewear device 100 would need to be pressed at 708 on the electronic eyewear device for a period of time (e.g., 7 seconds) to initiate the BLUETOOTH® discovery and bonding. However, this button press needs to be conducted without human invention for automation of the testing process. Sample code for simulating the button press is provided using gRPC commands as illustrated below:

```
Object C code (bolded below) that calls a shared C++ library:
    // Start at the advertising page
    // Send DUT request to simulate button press
    SCNManhattanShellResponse *response = [_client DUTShellRequest:@"press_button 7500"];
    NSLog(@"DUT response retcode: %d, stdout: %@, stderr: %@", [response shellRetCode], [response shellOut],
        [response shellErr]);
    // Check if successful response received. There is no point to continue the test if it failed here.
    XCTAssertNotNil(response);
    XCTAssertEqual([response shellRetCode], 0);
    // An empty response is received if failure to connect to test server (Manhattan)
    XCTAssert([response shellOut].length > 0);
Test Server Code:
    def DUTShellRequest(self, request, context):
        logger.info(request)
        try:
            results = self.DUT.runCommand(request.shellCommand)
            retCode = 0
            stdout = results
            stderr = ""
        except Exception as e:
            retCode = 1
            stdout = ""
            stderr = str(e)
            return manhattan_pb2.ShellResponse(shellRetCode=retCode, shellOut=str(stdout), shellErr=stderr)
```

These commands emulate the button press on the DUT 100 so that the testing of the pairing process may be fully automated by the test interface ("Manhattan" in the above example).

Figure 8:
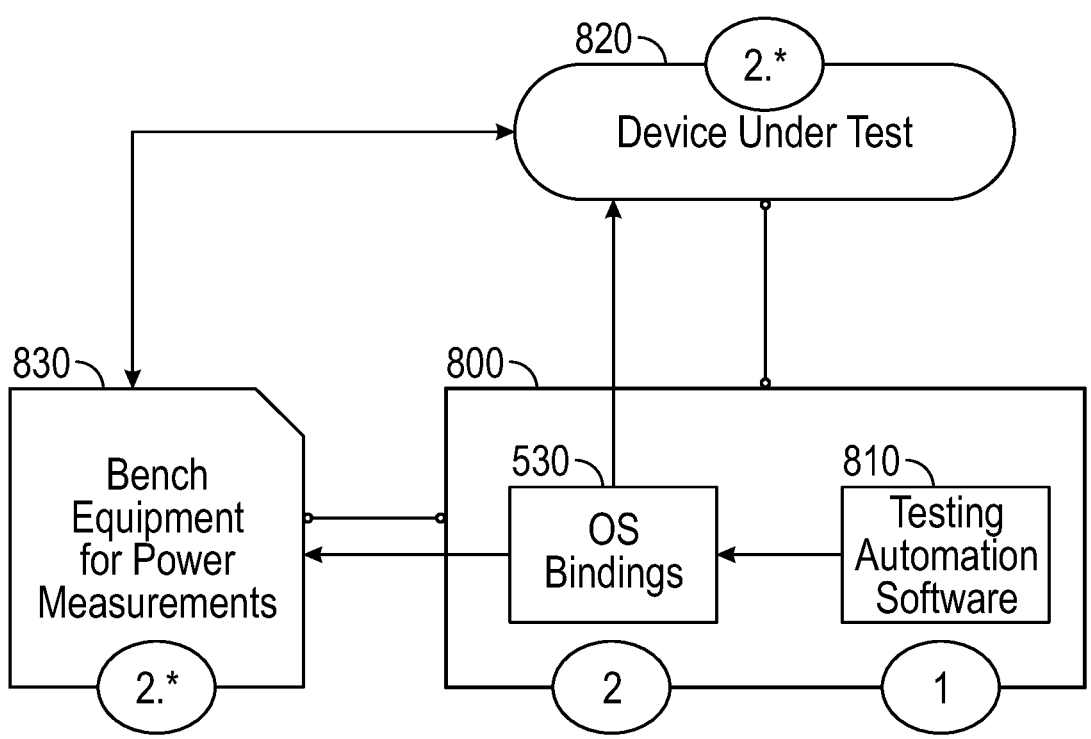
FIG. 8 illustrates a main automation flow in a sample configuration for a standard firmware test of a communication application operating system (OS) for a firmware repository that is incorporated into a client library of a Python gRPC server.

FIG. 8 illustrates the main automation flow in a sample configuration for a standard firmware test of the communication application operating system (OS) for the firmware repository of the electronic eyewear device 100 that is incorporated into the client library of the Python gRPC server 520. At (1), the testing automation software 810 of the testing system 800 (which may be in the cloud) processes a job and dispatches it to a test execution platform of the testing system 800. At (2), the test execution platform invokes the Python operating system bindings 530 for access to the device under test (DUT) 820 (in this case, the electronic eyewear device 100) and other hardware peripherals (if available). In sample configurations, the test is a series of steps coordinated by the OS bindings 530 with the DUT 820 and hardware peripherals. The OS bindings 530 provide abstractions for flashing the DUT 820, communicating with the low-power wireless circuitry 324 (e.g., Nordic UART Service chip) or high-speed wireless circuitry 336 (e.g., BLUETOOTH® sensor hub chip), accessing the power equipment 830, uploading metrics, and various other functionality.

Figure 9A:
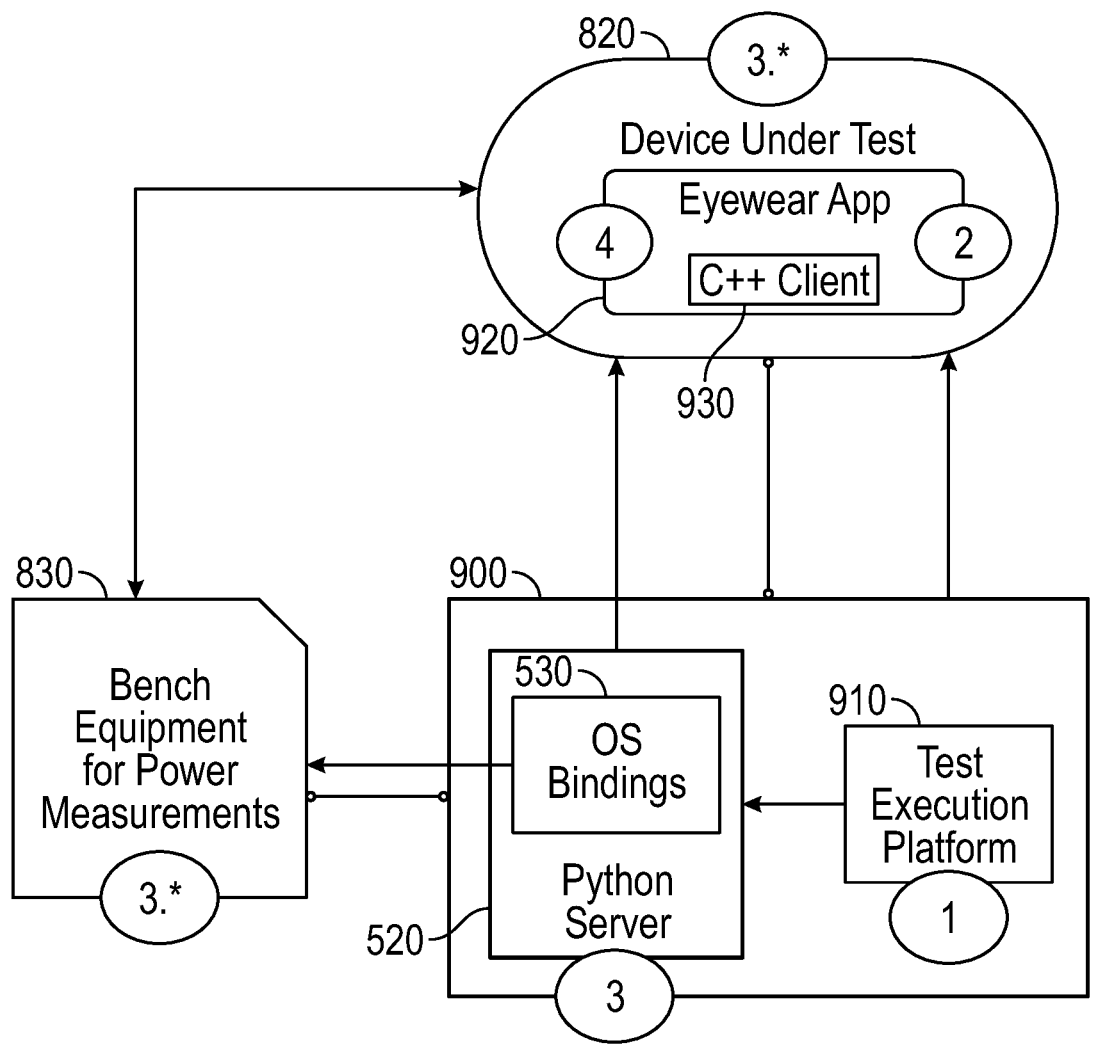
FIG. 9A illustrates a modified automation flow in a sample configuration including an electronic eyewear application of the electronic eyewear device as the module under test.

FIG. 9A illustrates the modified automation flow in a sample configuration where the testing execution platform includes an electronic eyewear app 920 for the DUT 820 (e.g., electronic eyewear device 100) as the module under test. The entry point from testing system 900 in this instance is the test execution platform 910. At (1), the test execution platform 910 will be responsible for ensuring that the Python server 520 is running, storing the URI (IP & port), and passing this information to the DUT 820 at (2). The eyewear app 920 of the DUT 820 is adapted to include the C++ library in the C++ client 930 in order to properly instantiate the C++ client 930 and to communicate with the Python server 520. At (3), the Python server 520 exposes the same Python OS bindings 530 as the OS flow in the example of FIG. 8. It is assumed that the electronic eyewear app 920 of the DUT 820 will be less inclined to use the device interfaces of the low-power wireless circuitry 324 (e.g., Nordic UART Service chip) or high-speed wireless circuitry 336 (e.g., BLUETOOTH® sensor hub chip) to manipulate the state of the DUT 820; however, the electronic eyewear app 920 of the DUT 820 could talk to other peripheral devices and rely heavily on some modules like the power equipment 830 at (4) to measure current before capturing the data flow.

Figure 9B:
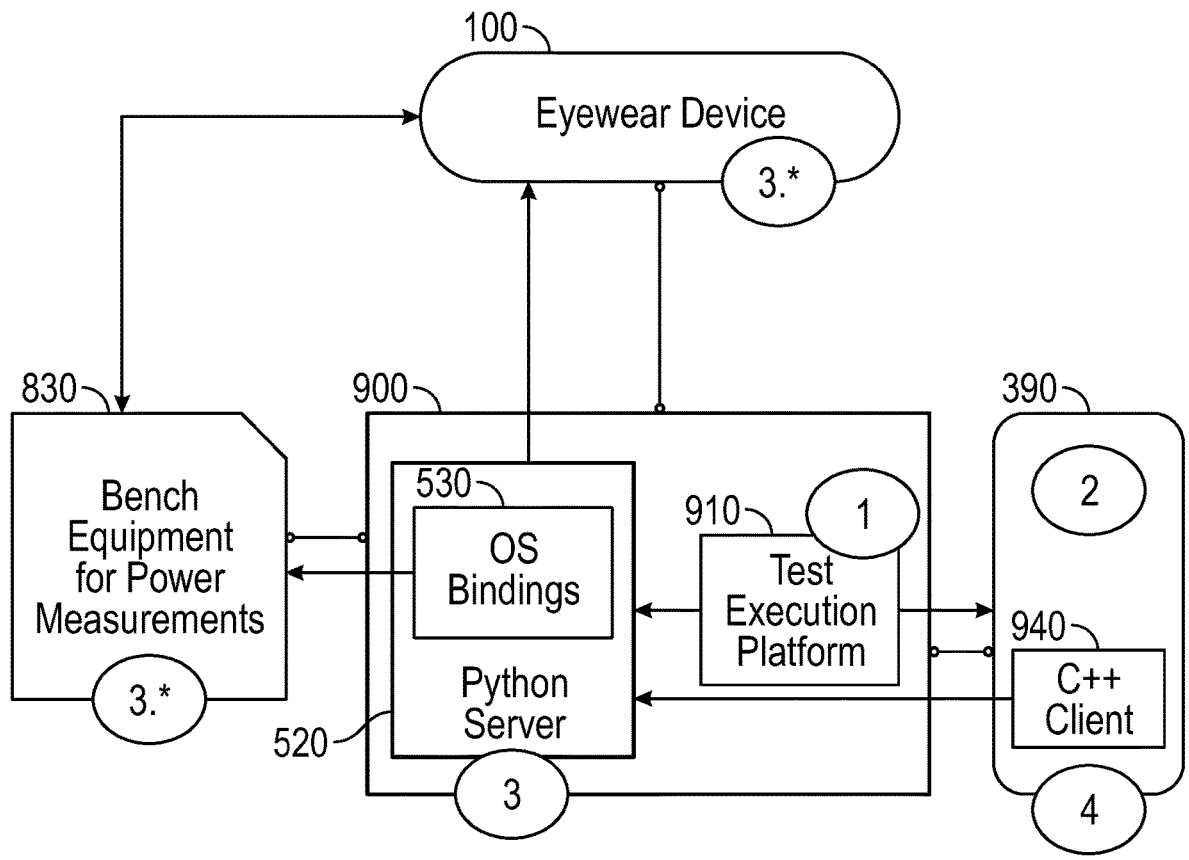
FIG. 9B illustrates the automation flow in a sample configuration including the mobile device's communication application as the module under test.

FIG. 9B illustrates the automation flow in a sample configuration including the mobile device's communication application as the module under test 820. Like the flow in FIG. 9A for testing the electronic eyewear app 920 of the electronic eyewear device 100, the entry point at (1) to the testing system 900 is the test execution platform 910 and it will have the same responsibilities. Like the flow in FIG. 9A for testing the electronic eyewear app 920 of the electronic eyewear device 100, the C++ client 940 is included in the mobile device 390 and compiled into the test at (2) and will communicate back with the Python server 520 at (3). The main flow the mobile device communication app has with an electronic eyewear device 100 is pairing, which is entirely reliant on both devices being in the proper states at the proper time. The entire interface using OS bindings 530 back to the electronic eyewear device 100 is used in this scenario. The C++ client 940 sends a gRPC command at (4) to determine the state of the low-power wireless circuitry 324 (e.g., Nordic UART Service chip) or high-speed wireless circuitry 336 (e.g., BLUETOOTH® sensor hub chip) as well as metrics parsing and possibly power measurements using power measurement equipment 830. These measurements are all dimensions that may be exercised and evaluated as part of the holistic validation of the operation of the communication application.

It will be appreciated that these configurations permit different development teams with different code bases (e.g., communication application and electronic eyewear device) to provide a generalized interface to send simple gRPC commands for testing purposes. The test logic may invoke calls to the low-power wireless circuitry 324 (e.g., Nordic UART Service chip) or high-speed wireless circuitry 336 (e.g., BLUETOOTH® sensor hub chip) via a shell interface with return codes indicating whether the test was successful or not.

Test Execution Flow

The test execution platform 910 may implement a test runner to execute the pairing flow as a functional test framework. Test jobs may be routed to a pairing rig using a testing system 900 adapted to receive commands for generating a pairing test. The testing system 900 triggers a pairing test against the latest operating system master for the mobile device 390 and will run over a 12 hour period. The testing system 900 picks up the job for the pairing test and kicks off the test runner for executing the pairing flow. The test execution platform 910 downloads the latest operating system master for the mobile device 390 and builds a test artifact from a cloud storage bucket. The test build is downloaded into the mobile device 390 and the test server 520 is started to pull the latest version of the firmware of the electronic eyewear device 100 for known builds for the mobile device 390 and the electronic eyewear device 100. The test server 520 also downloads the latest master of the operating system running the communication application and boots the electronic eyewear device 100 to start up the low-power wireless circuitry 324 (e.g., Nordic UART Service chip) and the high-speed wireless circuitry 336 (e.g., BLUETOOTH® sensor hub chip) to start receiving gRPC commands. The server 520 flashes the low-power wireless circuitry 324 and high-speed wireless circuitry 336 with the latest master of the communication application and configures the high-speed wireless circuitry 336 for testing by sending setup commands in developer mode (e.g., loads and wait-for-device root, disable-verity, and remount commands) and ensures that the high-speed wireless circuitry is fully booted. The test execution platform 910 installs the latest operating system master onto the mobile device 390 and runs a pairing test by installing a build for a pairing test run on the mobile device 390 (e.g., xcodebuild test-without-building).

During the pairing test, a 'mock_button' command is sent to the Python server 520 using the C++ client loaded into the device under test 820. As noted above, the mock button command is generated using gRPC commands to emulate the button press used to start the pairing process by the electronic eyewear device 100. The corresponding gRPC command is sent from the mobile device 390 to the electronic eyewear device 100 (DUT) through a binder RPC command from the OS bindings 530 that communicate with the firmware of the electronic eyewear device 100. The test execution platform 910 uploads a user interface test for the communication application and measures results in a log. The Python server 520 brings down the high-speed wireless circuitry 336 as part of the shutdown process, and the testing system 900 waits for the next job. An email notification is generated and a success ticket is generated if the pairing success rate is greater than a set threshold (e.g., 80% pairing success rate). The pairing success rate may be tracked as a key performance indicator to track pairing between different builds of the electronic eyewear device 100 and the communication application.

Figure 10:
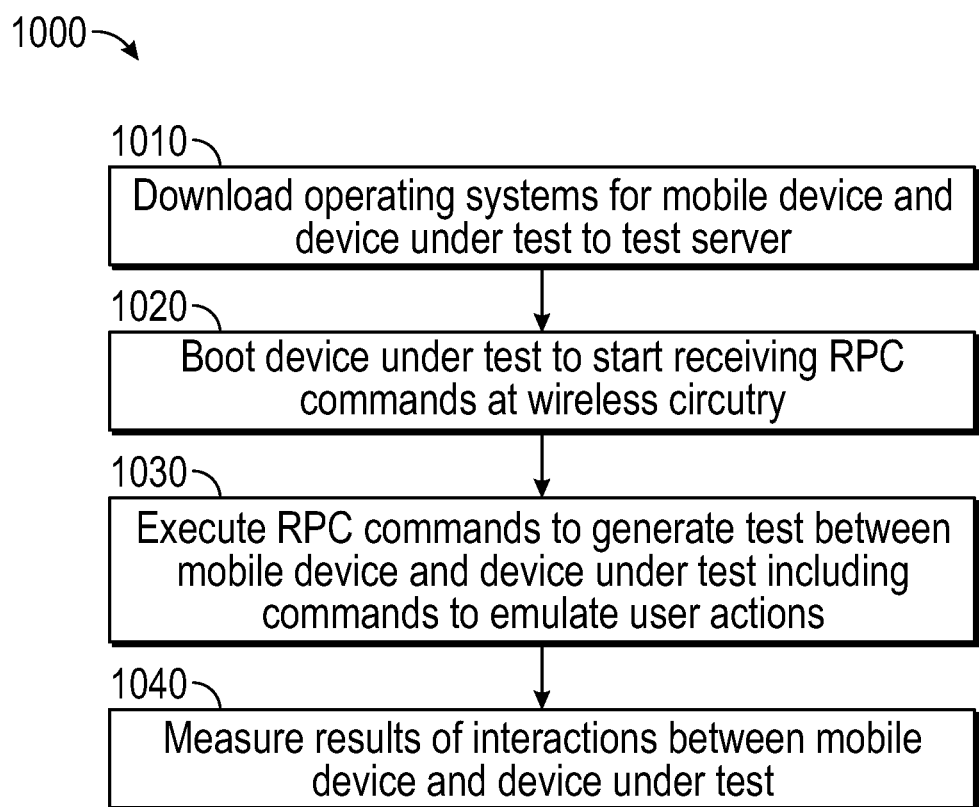
FIG. 10 illustrates a flow chart of a test execution flow in a sample configuration.

FIG. 10 illustrates a flow chart of a test execution flow in a sample configuration. In FIG. 10, the test execution flow is for providing a pairing test between a mobile device and a device under test, such as an electronic eyewear device. It will be appreciated that the test execution flow may be for other testing interactions besides pairing tests. For example, the test execution flow may also test data transfers between the devices.

As illustrated in FIG. 10, the test execution flow 1000 starts by downloading to test server 500 an operating system master for the mobile device 390 and a version of an operating system running a communication application on the device under test 100 at 1010. At 1020, the device under test 100 is booted to start receiving remote procedure call commands at least one wireless circuit of the device under test 100. At 1030, remote procedure call commands are executed to generate a test between the mobile device 390 and the device under test 100. In a sample configuration, the remote procedure call commands are adapted to generate a pairing test between the mobile device 390 and the device under test 100 and include commands adapted to emulate user activity for initiating interactions between the mobile device 390 and the device under test 100. For example, the remote procedure call commands may include commands adapted to emulate a button press command from at least one of the mobile device 390 or the device under test 100 for initiating the pairing process. As noted above, a user interface of the test server 500 may be adapted to execute the commands for emulating a button press command using a client program (e.g., C++ client 930, FIG. 9A) loaded into the device under test 100. The test server 500 may send the emulated button press command to the device under test to initiate pairing between the mobile device and the device under test, receive a response to the emulated button press command from the device under test, and send the response to the client program loaded into the device under test. At 1040, the results of the interactions (e.g., percentage of successful pairings) initiated by the emulated user activity are measured.

It will be appreciated by those skilled in the art that it is possible to roll out test interfaces as part of the testing infrastructure at either the platform (Java/Kotlin or Objective-C) testing layer or the shared test runner (test infrastructure) layer. Implementing in the platform may have the benefit of increased team ownership (logic exists in a codebase engineers touch daily) and that is easier to implement due to platform familiarity. Also, because all devices under test may be connected to a host machine via a USB by Pikaboost 610 (FIG. 6), it is conceivable that the USB may be used to communicate back to the host machine. Third party libraries like libusb also may integrate with C++ client and are supported on a variety of platforms. However, issuing commands over the operating system of the electronic eyewear device back to the host machine with libusb are not a supported workflow, which would lead to a potentially platform specific implementation to manage command forwarding. Furthermore, forwarding commands back to the host machine may still require some process on the host machine to intercept and execute the commands.

System Configuration

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 11:
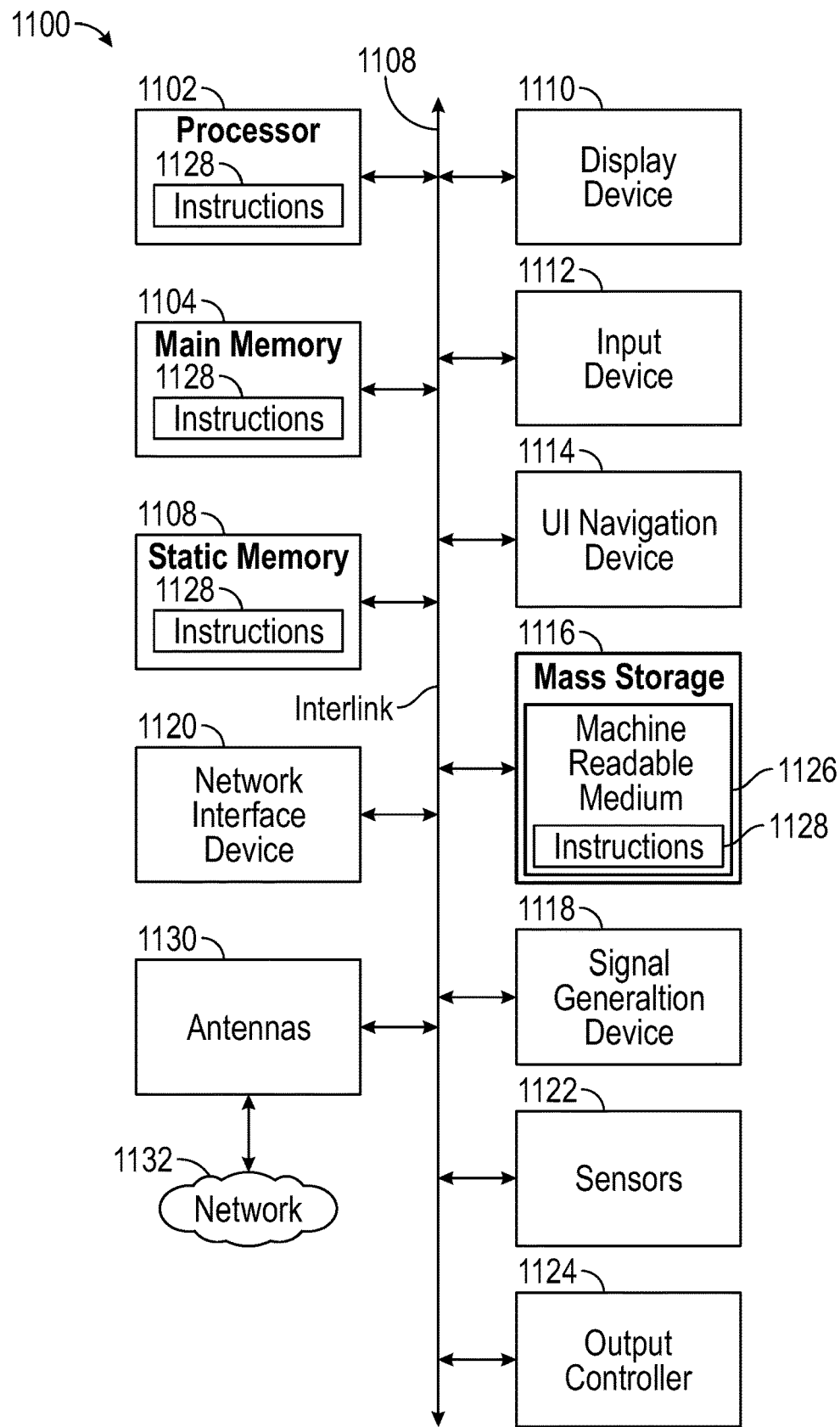
FIG. 11 illustrates a sample configuration of a computer system adapted to implement the automated testing platform in accordance with the systems and methods described herein.

By way of example, FIG. 11 illustrates a sample configuration of a computer system 1100 adapted to implement the automated testing platform in accordance with the systems and methods described herein. In particular, FIG. 11 illustrates a block diagram of an example of a machine 1100 upon which one or more configurations may be implemented. In alternative configurations, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. In sample configurations, the machine 1100 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1100 may serve as a workstation, a front-end server, or a back-end server of a communication system. Machine 1100 may implement the methods described herein by running the software used to implement the bots generated as described herein. Further, while only a single machine 1100 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110 (shown as a video display), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1122. Example sensors 1122 include one or more of a global positioning system (GPS) sensor, compass, accelerometer, temperature, light, camera, video camera, sensors of physical states or positions, pressure sensors, fingerprint sensors, retina scanners, or other sensors. The machine 1100 may include an output controller 1124, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1116 may include a machine readable medium 1126 on which is stored one or more sets of data structures or instructions 1128 (e.g., software) embodying or utilized by any one or more of the techniques or functions described herein. The instructions 1128 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the mass storage device 1116 may constitute machine readable media.

While the machine readable medium 1126 is illustrated as a single medium, the term "machine readable medium" may include a single medium or multiple media (e.g., at least one of a centralized or distributed database, or associated caches and servers) configured to store the one or more instructions 1128. The term "machine readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1128 may further be transmitted or received over communications network 1132 using a transmission medium via the network interface device 1120. The machine 1100 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas 1130 to connect to the communications network 1132. In an example, the network interface device 1120 may include a plurality of antennas 1130 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques.

The features and flow charts described herein can be embodied in one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of testing interactions between a mobile device and a device under test, comprising:
    downloading to a test server an operating system master for the mobile device and a version of an operating system running a communication application on the device under test, wherein the device under test and the mobile device have different operating systems;
    booting the device under test to start receiving remote procedure call commands using at least one wireless circuit of the device under test;
    sending and receiving remote procedure call commands directly from a test framework to/from the at least one wireless circuit of the device under test, the test framework enabling remote procedure call commands to be sent to the device under test from the mobile device and responses from the device under test to be received and forwarded to the mobile device; and
    executing the remote procedure call commands to manage a device state of the device under test.

2. The method of claim 1, further comprising using a client library as a proxy for remote procedure calls so as to allow remote procedure call commands to be issued directly from the test framework.

3. The method of claim 2, further comprising exposing bindings and functionality of the device under test, using the client library, via a remote procedure call service deployed in the test framework.

4. The method of claim 1, wherein executing the remote procedure call commands causes an automated pairing flow between the mobile device and the device under test.

5. The method of claim 1, wherein executing the remote procedure call commands causes emulation of user actions during operation of at least one of the mobile device or the device under test.

6. The method of claim 5, wherein the emulated user actions comprise a button press to initiate pairing of the mobile device and the device under test.

7. The method of claim 6, further comprising measuring a result of the pairing of the mobile device and the device under test.

8. The method of claim 1, further comprising entering the test framework via a test harness of the mobile device during execution of a test.

9. The method of claim 1, further comprising installing in the device under test a client program comprising a C++ implementation of a remote procedure call client.

10. The method of claim 9, further comprising importing and calling the client program, by an operating system of the mobile device, in a test compilation that allows a user to issue remote procedure calls to the test framework from the client program of the device under test.

11. The method of claim 9, further comprising installing a second client program adapted to run on the mobile device, the second client program sending and receiving remote procedure call commands from the mobile device to and from the test framework to determine a device state of the device under test.

12. The method of claim 1, further comprising running, by the test framework, a testing software stack that targets execution of a test on the mobile device.

13. The method of claim 12, wherein execution of the test on the mobile device comprises conducting a pairing test of an operating system of the mobile device.

14. The method of claim 1, further comprising providing a hardwired serial interface to provide a communication path between the test framework and the device under test to manage a flow of remote procedure call commands to the device under test.

15. The method of claim 14, further comprising providing, using the serial interface, a first universal serial bus (USB) serial channel to a first circuit of the device under test and a second USB serial channel to a second circuit of the device under test for remote procedure call commands to pass to and from the first circuit and the second circuit.

16. A non-transitory computer readable medium having instructions stored thereon, wherein execution of the instructions by at least one processor causes the at least one processor to implement a method of testing interactions between a mobile device and a device under test by performing operations including:
    downloading to a test server an operating system master for the mobile device and a version of an operating system running a communication application on the device under test, wherein the device under test and the mobile device have different operating systems;
    booting the device under test to start receiving remote procedure call commands using at least one wireless circuit of the device under test;
    sending and receiving remote procedure call commands directly from a test framework to/from the at least one wireless circuit of the device under test, the test framework enabling remote procedure call commands to be sent to the device under test from the mobile device and responses from the device under test to be received and forwarded to the mobile device; and
    executing the remote procedure call commands to manage a device state of the device under test.

17. The medium of claim 16, further comprising instructions that when executed by the at least one processor causes the at least one processor to perform operations including executing the remote procedure call commands to cause emulation of user actions during operation of at least one of the mobile device or the device under test.

18. The medium of claim 17, further comprising instructions that when executed by the at least one processor causes the at least one processor to perform operations including executing the remote procedure call commands to cause emulation of user actions including a button press to initiate pairing of the mobile device and the device under test.

19. The medium of claim 16, further comprising instructions that when executed by the at least one processor causes the at least one processor to perform operations including executing the remote procedure call commands to cause an automated pairing flow between the mobile device and the device under test.

20. The medium of claim 16, further comprising instructions that when executed by the at least one processor causes the at least one processor to perform operations including running, by the test framework, a testing software stack that targets execution of a test on the mobile device.

* * * * *